United States Patent [19]
Rasch et al.

[11] Patent Number: 5,698,912
[45] Date of Patent: Dec. 16, 1997

[54] BRUSHLESS MOTOR WITH TORQUE AND SPEED PROPORTIONAL COOLANT FLOW

[75] Inventors: Reinhard Rasch, Hechendorf; Andreas Gründl, München; Bernhard Hoffmann, Starnberg, all of Germany

[73] Assignee: Gründl und Hoffmann GmbH Gesellschaft für elektrotechnishe, Entiwicklungen, Germany

[21] Appl. No.: 556,822

[22] Filed: Nov. 2, 1995

[30] Foreign Application Priority Data

Mar. 8, 1994 [DE] Germany .................. 44 07 713.0

[51] Int. Cl.$^6$ .................................................. H02K 9/00
[52] U.S. Cl. .......................... 310/52; 310/51; 310/53; 310/54; 475/161; 180/65 E; 180/65.5
[58] Field of Search .......................... 310/51, 52, 53

[56] References Cited

U.S. PATENT DOCUMENTS

| | | | |
|---|---|---|---|
| 4,341,093 | 7/1982 | Oishi et al. | 62/505 |
| 4,418,777 | 12/1983 | Stockton | 180/65 E |
| 5,019,733 | 5/1991 | Kano et al. | 310/61 |
| 5,156,579 | 10/1992 | Wakuta et al. | 475/121 |
| 5,196,746 | 3/1993 | McCabria | 310/54 |
| 5,431,141 | 7/1995 | Kanazawa et al. | 123/399 |

FOREIGN PATENT DOCUMENTS

| | | | |
|---|---|---|---|
| 10 80 063 | 11/1927 | Austria . | |
| 1 381 593 | 11/1964 | France . | |
| 21 45 126 | 3/1973 | Germany | H02K 9/19 |
| 24 55 567 A1 | 5/1976 | Germany | H02K 9/24 |
| 25 38 561 A1 | 3/1977 | Germany | H02K 9/19 |
| 42 13 132 A1 | 11/1992 | Germany | H02K 9/19 |
| 58-116044 | 7/1983 | Japan | H02K 9/19 |
| 60-162434 | 8/1985 | Japan | H02K 9/19 |
| 2 250 063 | 5/1992 | United Kingdom | H02K 9/19 |

*Primary Examiner*—Steven L. Stephan
*Assistant Examiner*—Elvin G. Enad
*Attorney, Agent, or Firm*—Haverstock & Associates

[57] ABSTRACT

A brushless electric motor has a fluid-tight housing, an internal rotor which is connected to an output shaft, stator plates which are disposed at a radial spacing from the rotor, a coolant delivery line leading into the interior of the housing, and a coolant discharge line leading out of the housing. A control arrangement, which as a function of the rotational speed and torque adjusts the volume flow of the coolant flowing through the interior of the housing, is provided to keep the efficiency of the arrangement as a whole high and to provide an electric motor having high power density.

21 Claims, 3 Drawing Sheets

BRUSHLESS MOTOR WITH TORQUE AND SPEED PROPORTIONAL COOLANT FLOW

BACKGROUND OF THE INVENTION

The present invention relates to a brushless electric motor with a fluid-tight housing, an internally rotating rotor which is connected to an output shaft, a stator core arranged at a radial distance from the rotor, a coolant feeder leading into the housing interior, and a coolant outlet leading out of the housing.

Such electric motors in various designs have been known in the state of the art and are suitable under coolant-supplied operation to provide mechanical driving power up to a level which cannot be achieved in uncooled operation. As coolant, generally a non-aggressive oil with low viscosity and high boiling point is used.

From DE 21 45 126 A1 such an electric machine with oil spray cooling is known, where on either side of the machine a cooling circuit with spray openings is provided inside the machine, which spray the coolant exiting from these openings both onto the stator winding heads as well as onto the rotor.

These known motors, however, are mostly so designed and dimensioned that they are operated permanently either as spray oil motors or as oil-submerged motors.

In applications which require a uniform driving power, such motors can be employed with satisfactory power densities and a high efficiency.

However, where applications are involved requiring considerably varying speeds and/or torques, as it is the case e.g. with motor vehicle drives, the efficiency in the overall balance (total speed or total torque range) decreases substantially, because at high speeds, for example, the coolant in the oil-submerged motor results in considerable losses.

Therefore, improved cooling systems have been proposed.

From AT 10 80 63, a forced ventilation asynchronous motor is known where the speed and thus the performance of the cooling fan is controlled as a function of the slip frequency of the motor to be ventilated in such a manner that the cooling effect increases with the slip frequency.

From DE 25 38 561 A1 an oil-cooled induction motor is known, where the entire inner space of the housing is filled with oil. In this induction motor, the oil circulation pump is connected with the fan shaft. Thereby it is possible to achieve a cooling dependent on the induction motor speed.

From DE 42 13 132 A1 a water-cooled brushless electric motor is known. Here, the cooling water is circulated through water ducts in the housing. Besides the water cooling, an additional air cooling for the flow through the housing is disclosed, with the rotor rotation providing for the air circulation. The circulated air is not exchanged by the ambient air but is passed through a heat exchanger where it is cooled down again.

From DE 24 55 567 A1 a cooling water capacity control system for water-cooled three-phase a.c. motors is known, where a control valve with a thermoregulator and a temperature sensor is arranged in the cooling water outlet.

SUMMARY OF THE INVENTION

The object of the invention is to keep the overall efficiency of the arrangement high and to provide an electric motor with a high power density. To solve this object, the electric motor is developed according to the invention by a control means for adjusting the volumetric flow through the housing interior as a function of speed and torque.

This measure enables the volumetric flow through the electric motor to be matched to the speed and the torque in such a manner that both the dissipated heat (at high torque values) can be dissipated in the desired extent by operating the motor as a spray oil motor or as an oil-submerged motor and (at high speeds) the decelerating effect of the coolant can be eliminated by a (substantial) dry running of the electric motor.

The rotor rotation during the operation of the electric motor already causes a certain pumping action, which, however, is largely dependent on the speed of the electric motor. In order to achieve an adequate cooling effect also at low speeds (and high torque values) or in the case where the pumping action of the electric motor itself is not sufficient, it is advantageous to have the control means drive a pump, which passes the coolant through the coolant feeder into the interior of the electric motor and through the coolant outlet out of the electric motor.

In order to ensure that the electric motor can also operate (substantially) dry, i.e. without (or with only small amounts of) coolant, provisions have been made for the control means to drive a valve by means of which the volumetric flow of the coolant through the coolant feeder into the interior of the electric motor and through the coolant outlet out of the electric motor can be interrupted or reduced, respectively.

The location of the valve within the coolant circuit is i.a. dependent on whether the pump is a suction or a pressure pump. The sole decisive requirements that must be met are the interruptibility of the coolant circuit by the valve and the possibility to pump the coolant with the coolant circuit interrupted out of the interior of the electric motor.

In addition, a reservoir can be provided for the coolant which stores the coolant, e.g. during dry running of the electric motor.

Finally, a heat exchanger formed as a radiator, which may be forced-cooled by means of a fan, can be provided in the cooling circuit for cooling the heated coolant in the electric motor.

In a preferred embodiment of the brushless electric motor, the coolant feeder in the area of a face plate of the rotor reaches into the housing interior. It is not decisive whether the feeder leads in a radial or a tangential direction to the rotor or its face plate, respectively, but it is important only that the coolant supplied—in the floated or spray oil operation—comes into contact with the rotor or its face plate, respectively, so that it is fed outside, at least partially, to the stator windings.

If the coolant is directed to the face plate of the rotor, it is advantageous for a proportional distribution of the coolant that the face plate comprises a pick-up for the coolant. This can advance the coolant to those major parts of the electric motor which are to be cooled.

In an embodiment of the electric motor the coolant feeder to the rotor passes through its axis of rotation and opens into at least two coolant lines leading to the outer circumference of the rotor. This configuration offers a particularly good pumping action for the coolant because the pump capacity is dependent on the radial travel of the coolant and increases as the square of the travel.

Another embodiment of the electric motor provides a pick-up shaped as a circular recess, which comprises a continuous web at its radial outer wall, the free end of which faces toward the axis of rotation of the rotor. This web ensures that the coolant does not flow off in a forward direction (away from the rotor face toward the housing inner wall), but is available to cool those parts for which cooling is a requirement.

For a particularly simple supply of the coolant, the coolant feeder is arranged to be offset relative to the web in a radially inward direction and the outlet of the coolant feeder projects above the continuous web in an axial direction to the bottom of the pick-up.

If the internal rotor has a bell-type shape with a free inner space it is advantageous to connect the pick-up in the radially external area of its bottom or the coolant lines, respectively (in the case of the central coolant supply) with at least one coolant duct each, which reaches into the rotor interior. This enables the cooling of parts arranged in the rotor interior in a simple manner and the cooling of those parts set back relative to the rotor face plate by means of the coolant.

In order to ensure the reliable transport of the coolant from the circular recess-shaped pick-up to other areas of the electric motor or to enable the pick-up to be completely emptied, respectively, it is provided to offset the inlet of the coolant duct at the pick-up bottom relative to the outlet of the coolant duct in the rotor interior in a radially inward direction.

In order to be able to accept a certain coolant volume in the rotor inner wall, which on the one hand can cool the rotor and on the other hand provides a coolant supply that can be directed to other parts of the electric motor, it is advantageous to offset the outlet of the coolant duct in a radially inward direction in the rotor interior at least relative to a radially expanded wall section of the inner space of the bell-shaped rotor.

In order to enable the further transport of the coolant from this expanded wall section to other parts of the electric motor, the expanded wall section of the inner space comprises at least one coolant passage to the outside of the bell-shaped rotor.

To advance the coolant under the action of the centrifugal force from the rotor face plate also to the parts arranged further to the rear, it is preferable to provide for a conical expansion of the wall of the inner space towards the free edge of the rotor at the side of the wall section opposite the rotor face plate. Grooves can also be provided to establish preferred flow paths for the coolant at the rotor inner wall.

The coolant can also flow from the rotor face plate through ducts provided within the rotor wall to the free end of the rotor where it is discharged.

In order to direct the coolant to the one (rear) set of heads of the stator winding, the free edge of the rotor can be designed so as to extend in an axial direction up to in front of or directly up to the one set of heads of the stator winding. There, the coolant will leave the rotor and be expelled by the centrifugal forces onto the heads of the stator winding.

In order to direct the coolant to the other (front) set of heads of the stator winding also, at least one coolant duct may be provided which extends from the side of the expanded wall section facing the rotor face plate to the outside of the rotor in an axial direction up to in front of or directly up to the other set of heads of the stator winding.

Another possibility for cooling the stator winding heads is to direct coolant through a coolant passage in the area of the expanded wall section to the rotor outside into the axial grooves machined into the outer surface and to the respective shorting rings. From there, the coolant is expelled to the shorting rings cooling same. From the shorting rings, the coolant is further expelled radially outward to the stator winding heads in order to cool these also.

For directing the coolant also to the rotor outside or to parts attached thereto (e.g. rotor cage), at least one coolant passage can be provided which extends from the expanded wall section to the rotor outside in a radial direction, through which coolant can reach the bars of the rotor cage arranged at the outside of the rotor.

In a particularly preferred embodiment of the electric motor at least part of a gear is arranged in the free inner space of the rotor. In this manner, that part of the gear so arranged is simultaneously cooled by the coolant directed along the rotor inner side, which enables a particularly simple, because encapsulated, design of the gear with a high power density.

Particularly in that case where the gear is arranged in a fluid tight gearbox which together with at least one section of the wall of the rotor inner space forms an annular gap, a very good cooling of the gear is achieved, because then the coolant in the spray oil operation as well is positively directed between the inner wall of the rotor and the outer wall of the gear.

Thus the gear in the gearbox can be essentially completely submerged in gear oil. Due to the fact that gear oil often contains friction-reducing additives which are very aggressive and attack the insulation of electric lines as well as metal chips which would cause short circuits in the windings of the electric motor, a second separate cooling circuit would be required for the circulation and cooling of the gear oil. This second cooling circuit is no longer necessary when cooling the gearbox externally.

A decisive aspect of the invention therefore is that the coolant dependent on the speed and the torque to be provided by the electric motor is brought to the respective parts of the electric motor in such a manner that an optimum cooling is effected which is adapted to the momentary speed and torque. To this end, the coolant is brought partly directly and partly successively to the individual parts of the electric motors by means of its rotor or the centrifugal force generated by it, respectively.

The electric motor is preferably operated in such a manner that in the range from 0% to approx. 30% of the continuous speed and in the range from approx. 60% to approx. 100% of the maximum torque of the electric motor the control means adjusts the ratio between the volumetric flow of the coolant supplied through the coolant feeder and the volumetric flow of the coolant discharged through the coolant outlet so that the housing of the electric motor is completely filled with coolant.

It is further ensured by the control means that in the range from 0% to approx. 100% of the continuous speed and in the range from approx. 10% to approx. 60% of the maximum torque of the electric motor the ratio between the volumetric flow supplied through the coolant feeder and the volumetric flow of the coolant discharged through the coolant outlet is so adjusted that with an essentially coolant sump-free housing of the electric motor, the coolant flows into the pick-up through the coolant feeder, from where it reaches the inner space of the rotor in its radially expanded wall section via the coolant duct, and then flows through the coolant duct(s) and the annular gap to the stator heads or the outside of the rotor, respectively (e.g. to the bars of the rotor cage).

Finally, the control means provides for the inflow of no or only small quantities of coolant into the housing of the electric motor at a continuous speed range from 0% to approx. 100% and a range from approx. 0% to approx. 10% of the maximum torque of the electric motor.

BRIEF DESCRIPTION OF THE DRAWINGS

In the following, the invention will be described in detail with reference to the drawing, in which.

DETAILED DESCRIPTION OF THE PREFERRED EMBODIMENT

Figure 1:
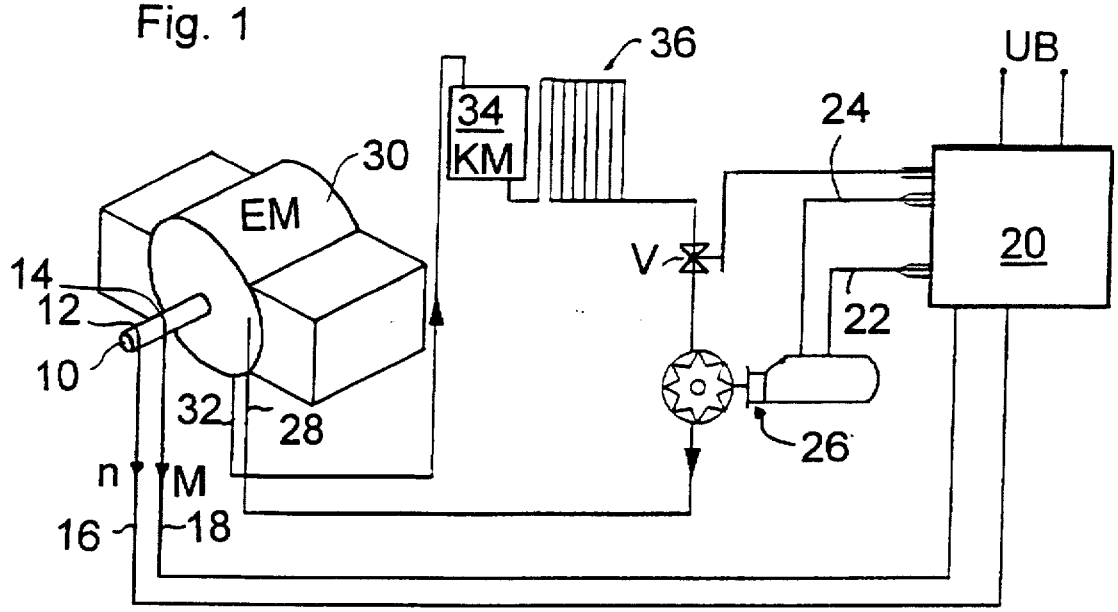
FIG. 1 shows a basic circuit diagram of the electric motor with the associated control means.

FIG. 1 shows a brushless electric motor EM designed as an internal rotor, an output shaft 10 of which comprises a first sensor 12, being represented only schematically, for sensing a speed (n) and a second sensor 14, which is also represented only schematically, for sensing a torque (M). The output signals of the first and second sensor 12, 14 are supplied to a control means 20 via lines 16, 18.

The control means 20 drives a pump 26 via two lines 22, 24, with the pump being interconnected in a coolant circuit which is formed by a coolant feeder 28 leading into a fluid-tight housing 30 of the electric motor EM, a coolant outlet 32 leading out of the housing 30, a coolant reservoir 34 and a radiator 36. For the purpose of interrupting the coolant circuit, a shut-off valve V which can also be driven by the control means 20 is interconnected in the coolant circuit upstream of the pump 26.

The control means 20 is fed by an operating voltage UB and is implemented either by a hardwired circuit or by an appropriately programmed microprocessor with the required peripherals (analog/digital converter for the sensor signals, power driver for the pump and the valve, data and program memories, etc.).

Figure 2:
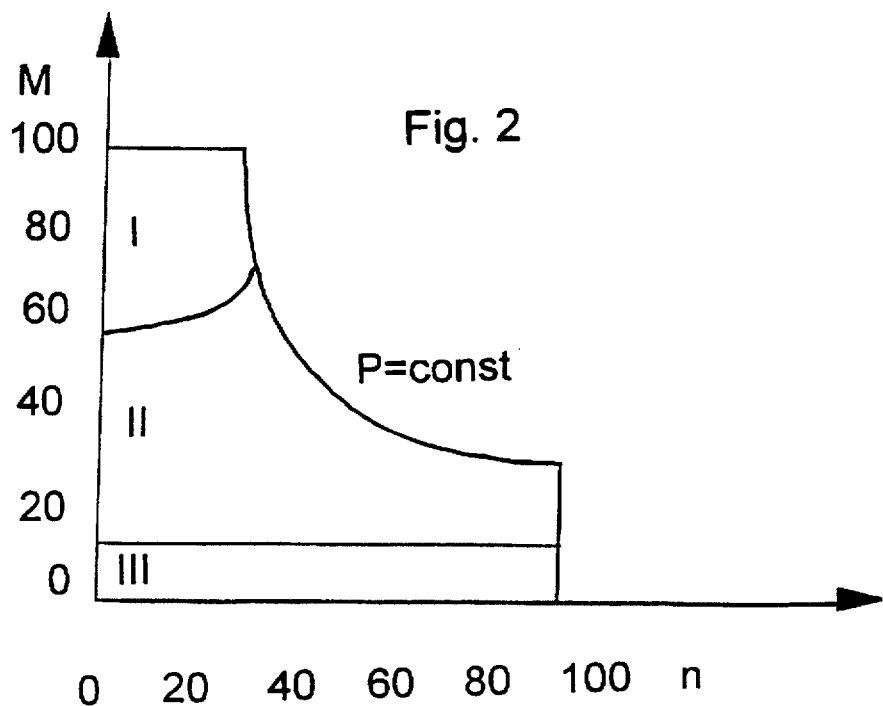
FIG. 2 shows a diagram of the different operating conditions.

FIG. 2 illustrates how the control means 20 controls the coolant circuit as a function of the speed (n) and the torque (M). The abscissa or the ordinate, respectively, are dimensioned as a percentage of the continuous speed or the maximum torque, respectively.

In the range from 0% to approx. 30% of the continuous speed and in the range from approx. 60% to approx. 100% of the maximum torque of the electric motor the control means 20 adjusts the ratio between the volumetric flow of a coolant KM supplied through the coolant feeder 28 and the volumetric flow of the coolant KM discharged through the coolant outlet 32 so that the housing 30 of the electric motor EM is completely filled with coolant KM. This area is indicated by I in the diagram.

In the range from 0% to approx. 100% of the continuous speed and in the range from approx. 10% to approx. 60% of the maximum torque of the electric motor EM the control means 20 also adjusts the ratio between the volumetric flow of the coolant KM supplied through the coolant feeder 28 and the volumetric flow of the coolant KM discharged through the coolant outlet 32 so that with the essentially coolant sump-free housing 30 of the electric motor EM the coolant KM flows through the coolant feeder 28 into the interior of the housing 30 where it cools those parts of the electric motor EM requiring cooling, and then leaves the housing 30 of the electric motor EM through the coolant outlet 32. This area is indicated by II in the diagram.

The course of the path which is followed by the coolant KM in the interior of the housing 30 of the electric motor EM will be described in detail below in conjunction with the description of the electric motor EM itself.

Finally, the control means drives the pump 26 and the valve V in such a manner that in the range from 0% to approx. 100% of the continuous speed and in the range from approx. 0% to approx. 10% of the maximum torque of the electric motor EM no coolant KM flows into the housing 30 of the electric motor EM so that it runs dry. This area is indicated by III in the diagram.

Figure 3:
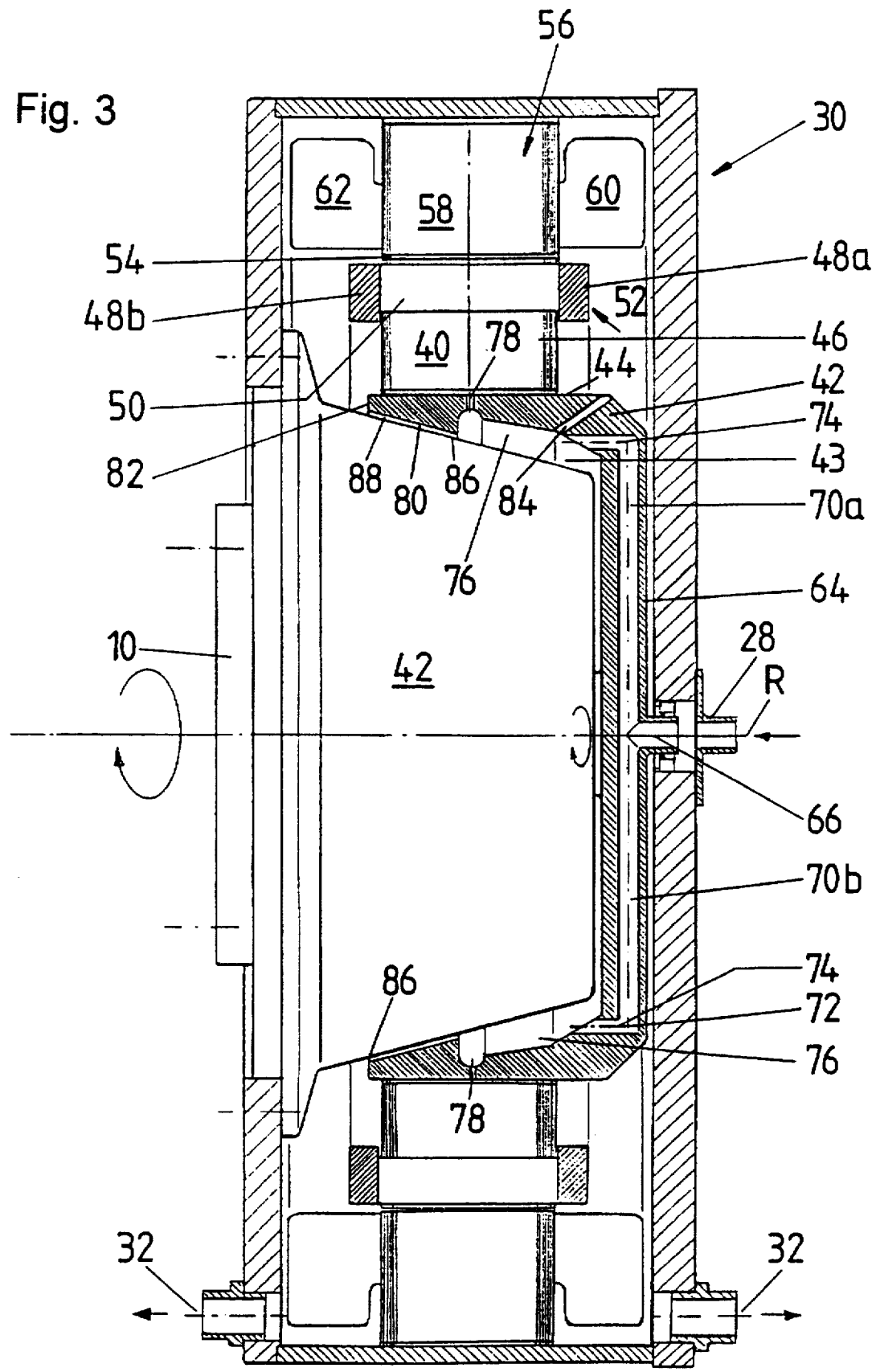
FIG. 3 shows a schematic cross-section through an electric motor according to the invention in a first embodiment.

FIG. 3 shows a first embodiment of the electric motor. In the interior of the housing 30 an internally rotating rotor 40 is rotatably supported, which is coupled with the output shaft 10 via a speed reduction gear 42, a detailed description of which can be omitted. The rotor 40 has the shape of a bell, an inner space 43 of which at least partly accommodates the gear 42. At its outer surface 44 the rotor 40 carries a rotor lamination arrangement 46 which is contained by a cage 52 formed by two shorting rings 48a, 48b arranged at an axial distance to each other and by copper bars 50 connecting these. A stator core 56 is arranged in a radial distance from the rotor so as to form an annular gap 54. The stator core consists of a lamination arrangement 58 as well as of stator windings, the winding heads 60, 62 of which protrude from both face ends of the lamination arrangement 58.

The coolant feeder 28 is arranged in an axis of rotation R on the face end of the housing 30 of the electric motor EM opposite the output shaft 10. With this embodiment, the face plate 64 of the rotor 40 comprises a passage 66 for the coolant KM. For symmetry reasons, at least two coolant lines 70a, 70b branch off the passage 66 and lead to the outer circumference of the rotor 40.

Each of the coolant lines 70a, 70b is connected with at least one coolant duct 74, which extends into the inner space 43 of the rotor 40.

The outlet of the coolant ducts 74 into the inner space 43 of the rotor 40 is arranged to be set back radially inward at least relative to a radially expanded wall section 76 of the inner space 43 of the bell-shaped rotor 40. This allows the uniform distribution of the coolant KM in the expanded wall section 76.

The expanded wall section 76 of the inner space 43 comprises several coolant passages 78 which are equally spaced around the circumference of the rotor 40 and grooves (not shown) to the outer surface 44 of the bell-shaped rotor 40, through which the coolant KM can flow to the outside (rotor cooling).

From the expanded wall section 76 the coolant KM which does not flow through the coolant passages 78 to the outside can flow from the expanded wall section 76 along an inner wall 80 of the rotor 40 to a free edge 82 of the rotor 40. This becomes possible because the wall 80 of the inner space 43 is conically expanded at the side of the wall section 76 opposite the face plate 64 of the rotor 40 (gear cooling).

In the embodiment shown, the free edge 82 of the rotor 40 extends in an axial direction up to in front of or directly up to the one set of heads 62 of the stator winding.

Several coolant passages 84 can also extend in an axial direction from the side of the expanded wall section 76 facing the face plate 64 of the rotor 40 to the outer surface 44 of the rotor 40, up to in front of or directly up to the other heads 60 of the stator winding, which are spaced around the circumference of the rotor 40 in the same manner as the coolant passages 78. This also allows the cooling of the other heads 60 of the stator winding. Instead of being branched off the expanded wall section 76, these coolant passages 84 can also be extensions of the ducts 70a, 70b. The coolant passages 84 can, however, be omitted if an adequate amount of the coolant KM flows from the expanded wall section 76 through the coolant passages 78 to the outside, also moves through the axial grooves (not shown) along the outer surface of the rotor toward the shorting rings of the rotor, is flung onto these by the centrifugal force and from there onto the stator winding heads.

Moreover, the coolant KM being expelled from the free edge 82 of the rotor 40 toward the heads 60 of the stator winding or the coolant KM, respectively, being expelled from the coolant passages 84 toward the heads 62 of the stator winding, also effects the cooling of the respective shorting rings 48a, 48b.

The coolant passages 78, however, enable the coolant KM to reach the copper bars 50 of cage for the purpose of cooling same.

As already mentioned, at least part of the gear 42 is arranged within the free inner space 43 of the rotor 40. The gear 42 is arranged in a fluid-tight gearbox 86 which, together with a section of the wall 80 of the inner space 43 of the rotor 40, forms an annular gap 88.

Thus the gear 42 is externally cooled by the coolant KM so that the gear 42 can be encapsulated in the gearbox 86 and be submerged essentially in gear oil.

In the outer lower area of the housing 30 of the electric motor EM coolant outlets 32, 32' are provided at both of its end faces, through which the heated coolant KM leaves the electric motor to be cooled down again.

Figure 4:
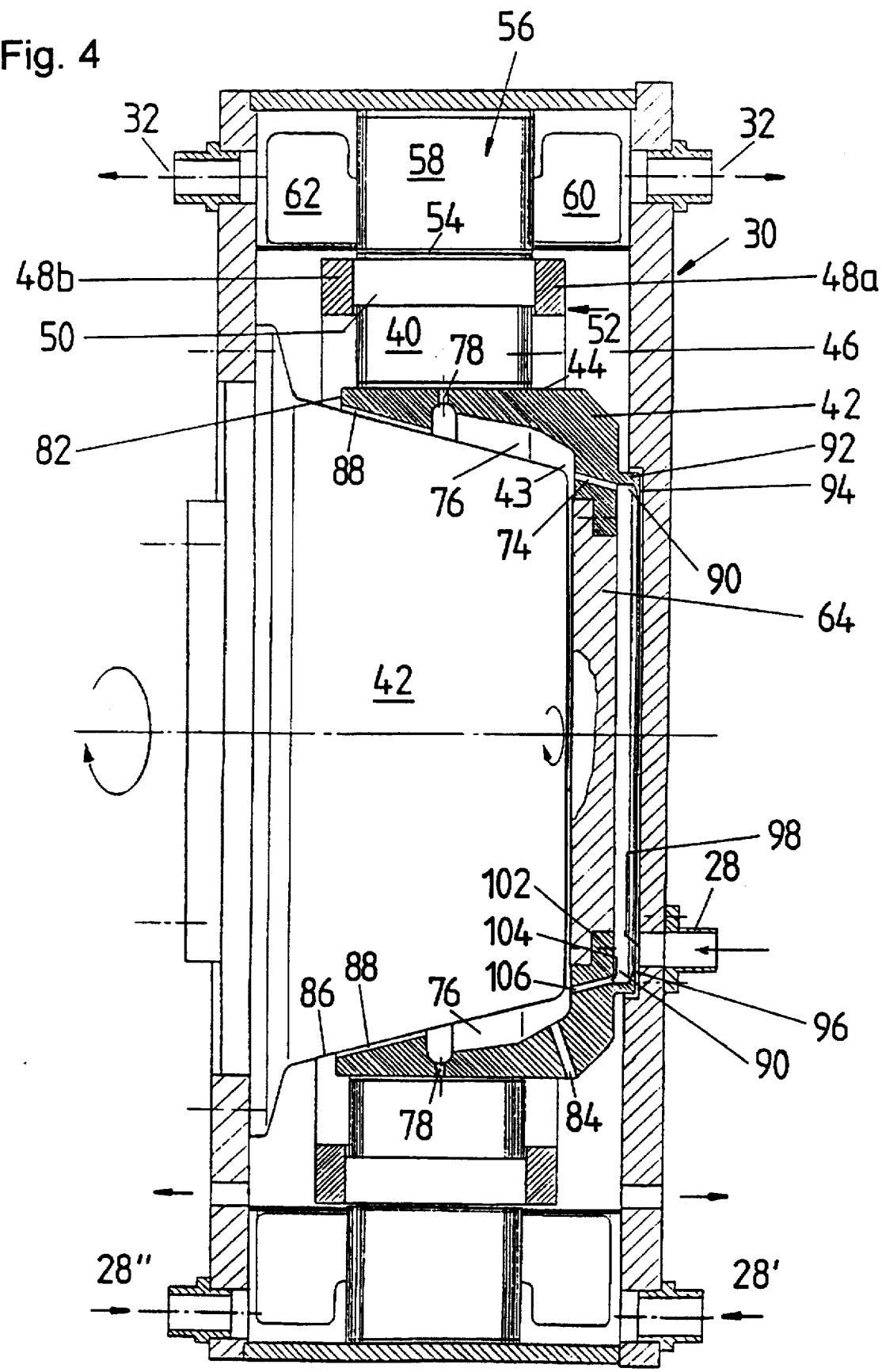
FIG. 4 shows a schematic cross-section through an electric motor according to the invention in a second embodiment.

In the embodiment according to FIG. 4 two essential modifications have been made compared to FIG. 3 insofar as the coolant feeder 28 is arranged eccentrically here and, in addition, further coolant feeders 28', 28" are provided for separately cooling the heads 60, 62 of the stator winding. This version is advantageous in that particularly with a viscous coolant (e.g. due to low ambient temperatures) it is ensured that the heads 60, 62 of the stator winding are cooled inspite of the viscosity, although only an insufficient quantity of the coolant KM reaches the heads 60, 62 of the stator winding through the coolant passages 78, 84 and from the free edge 82 of the rotor 40. It is thus achieved that at higher speeds only small quantities have to be pumped from the rotor interior.

The coolant feeder 28 could be arranged centrically as well.

Moreover, the passage 66 for the coolant feeder 28 in FIG. 3 is relatively complicated, and the embodiment according to FIG. 4 provides a simpler solution.

It should be noted that parts identical with those shown in FIG. 3 have been assigned the same reference numerals, and their repeated description will be dispensed with in the following.

The face plate 64 of the rotor comprises a pick-up 90 for the coolant KM. The pick-up 90 is shaped as a circular recess and comprises a continuous web 94 at its radially outer wall 92, a free end 96 of which extends toward the axis of rotation R.

The coolant feeder 28 is offset radially inward relative to the continuous web 94 or ots free end 96, respectively, and an outlet 98 of the coolant feeder 28 can project over the continuous web 94 or its free end 96, respectively, in an axial direction to a bottom 92 of the pick-up 90. An inlet 104 of the coolant duct 74 at the bottom 102 of the pick-up 90 is offset radially inward relative to an outlet 106 of the coolant duct 74 into the inner space 43 of the rotor 40. Moreover, the outlet 106 of the coolant duct 74 into the inner space 43 of the rotor 40 offset radially inward relative to the radially expanded wall section 76 of the inner space 43 of the rotor 40.

Otherwise, the further path of the coolant KM is the same as in the embodiment according to FIG. 3.

We claim:

1. A brushless electric motor comprising:
    a fluid-tight housing;
    an internally rotating rotor which is connected with an output shaft;
    a stator core arranged at a radial distance from the rotor;
    a coolant feeder leading into the interior of the housing;
    a coolant outlet leading out of the housing; and
    a control means for adjusting the volumetric flow of a coolant through the interior of the housing as a function of speed and torque, characterized in that in the range from 0% to approximately 30% of the continuous speed and in the range from approximately 60% to approximately 100% of the maximum torque of the electric motor the control means adjusts the ratio of between the volumetric flow of the coolant supplied through the coolant feeder and the volumetric flow of the coolant discharged through the coolant outlet so that the housing of the electric motor is completely filled with coolant, and in the range from 0% to approximately 100% of the continuous speed and in the range from approximately 0% to approximately 10% of the maximum torque of the electric motor the control means adjusts the ratio between the volumetric flow supplied through the coolant feeder and the volumetric flow of the coolant discharged through the coolant outlet so that no or only small quantities of coolant flow into the housing of the electric motor.

2. A brushless electric motor according to claim 1 characterized in that the control means drives a pump which delivers the coolant through the coolant feeder into the interior of the electric motor and through the coolant outlet out of the electric motor.

3. A brushless electric motor according to claim 1 characterized in that the control means drives a valve by means of which the volmetric flow of the coolant through the coolant feeder into the interior of the electric motor and through the coolant outlet out of the electric motor can be interrupted.

4. A brushless electric motor according to claim 1 characterized in that the coolant feeder reaches into the interior of the housing in the area of a face plate of the rotor.

5. A brushless electric motor according to claim 4 characterized in that the face plate of the rotor comprises an inlet for the coolant.

6. A brushless electric motor according to claim 4 characterized in that the coolant feeder leads to the rotor through its axis of rotation and opens into at least two coolant lines leading to the outer circumference of the rotor.

7. A brushless electric motor according to claim 5 characterized in that the inlet is shaped as a circular recess and comprises a continuous web at its radial outer wall, the free end of which extends toward the axis of rotation of the rotor.

8. A brushless electric motor according to claim 7 characterized in that the coolant feeder is offset radially inward relative to the continuous web, and an outlet of the coolant feeder projects over the continuous web in an axial direction toward a bottom of the inlet.

9. A brushless electric motor according to claim 1 characterized in that the rotor has a bell-shaped configuration with a free internal space.

10. A brushless electric motor according to claim 5, 6, 7 or 8 characterized in that the inlet with the radial outer area of its bottom or the coolant lines, respectively, are connected with at least one coolant duct each which leads into the internal space of the rotor.

11. A brushless electric motor according to claim 8 characterized in that an inlet of the coolant duct on the bottom of the inlet is offset radially inward into the inner space of the rotor with respect to the outlet of the coolant duct.

12. A brushless electric motor according to claim 8 characterized in that the outlet of the coolant duct into the inner space of the rotor is radially offset in an inward direction at least with respect to a radially expanded wall section of the inner space of the rotor.

13. A brushless electric motor according to claim 12 characterized in that the expanded wall section of the inner space comprises at least one coolant passage to the outer surface of the rotor.

14. A brushless electric motor according to claim 5 characterized in that a wall of the inner space at the side opposite the face plate of the rotor expands conically towards a free edge of the rotor.

15. A brushless electric motor according to claim 14 characterized in that the free edge of the rotor extends in an axial direction up to in front of or directly up to one set of heads of the stator winding.

16. A brushless electric motor according to claim 15 characterized in that at least one coolant duct extends from the side of the expanded wall section facing towards the face plate of the rotor to the outer surface of the rotor in an axial direction up to in front of or directly up to the other heads of the stator winding.

17. A brushless electric motor according to claim 15 characterized in that at least one coolant passage extends from the expanded wall section in a radial direction to the outer surface of the rotor, through which the coolant can reach bars of a rotor cage, which are arranged at the outer surface of the rotor.

18. A brushless electric motor according to claim 9 characterized in that at least part of a gear is arranged in the free internal space of the rotor.

19. A brushless electric motor according to claim 18 characterized in that the gear is arranged in a fluid-tight gearbox which together with at least a section of the wall of the inner space of the rotor forms an annular gap.

20. A brushless electric motor according to claim 18 characterized in that the gear is encapsulated in the gearbox and submerged essentially completely in gear oil.

21. A brushless electric motor according to claim 1 characterized in that in the range from 0% to approximately 100% of the continuous speed and in the range from 10% to approximately 60% of the maximum torque of the electric motor the control means adjusts the ratio between the volumetric flow supplied through the coolant feeder and the volumetric flow of the coolant discharged through the coolant outlet so that with an essentially coolant sump-free housing of the electric motor, the coolant flows through the coolant feeder into the inlet or into the radially extending coolant ducts, respectively, from where it reaches the inner space of the rotor in its radially expanded wall section via the coolant duct, then flows through the coolant duct and the annular gap to the stator heads or the outside of the rotor, respectively.

* * * * *

UNITED STATES PATENT AND TRADEMARK OFFICE
CERTIFICATE OF CORRECTION

PATENT NO. : 5,698,912

DATED : December 16, 1997

INVENTOR(S) : Reinhard Rasch et al.

It is certified that error appears in the above-identified patent and that said Letters Patent is hereby correct as shown below:

IN THE ASSIGNEE (ITEM #73, Title page ):

DELETE:

Grundl und Hoffmann GmbH Gesellschaft fur elektrotechnishe Entiwicklungen, Germany

INSERT --

Gründl und Hoffmann GmbH Gesellschaft für elektrotechnische Entwicklungen
Starnerg, Germany --

Signed and Sealed this

Twenty-second Day of December, 1998

Attest:

BRUCE LEHMAN

*Attesting Officer*  *Commissioner of Patents and Trademarks*